United States Patent [19]

Reesman

[11] 3,843,815
[45] Oct. 22, 1974

[54] INHIBITING GEL FORMATION IN MEAT-IN-GRAVY PRODUCTS

[75] Inventor: Stanley H. Reesman, Battle Creek, Mich.

[73] Assignee: General Foods Corporation, White Plains, N.Y.

[22] Filed: Feb. 10, 1972

[21] Appl. No.: 225,313

[52] U.S. Cl.............. 426/325, 426/330, 426/129, 426/203, 426/805
[51] Int. Cl.............................................. A23b 1/12
[58] Field of Search ......... 99/214, 2 R, 7, 107, 187, 99/224, 190, 171 H; 426/129, 131, 168, 203, 325, 326, 330, 407

[56] References Cited
UNITED STATES PATENTS

| | | |
|---|---|---|
| 3,115,409 | 12/1963 | Hallinan et al. .......................... 99/7 |
| 3,561,972 | 2/1971 | Dodge et al. ............................. 99/7 |
| 3,574,633 | 4/1971 | Flier........................................ 99/108 |
| 3,580,725 | 5/1971 | Kuster..................................... 99/107 |
| 3,653,908 | 4/1972 | Buck et al................................ 99/2 R |
| 3,679,429 | 7/1972 | Mohrman et al. ....................... 99/2 R |
| 3,689,284 | 9/1972 | Nash et al............................... 99/107 |
| 3,697,291 | 10/1972 | Tonsbeek................................ 99/107 |

Primary Examiner—Wilbur L. Bascomb, Jr.
Assistant Examiner—Curtis P. Ribando
Attorney, Agent, or Firm—Bruno P. Struzzi; Thomas V. Sullivan; William J. Speranza

[57] ABSTRACT

Gel formation in meat-in-gravy products which are subjected to heat processing after packaging is effectively inhibited by incorporating an acid in the product prior to packaging and sealing.

1 Claim, No Drawings

INHIBITING GEL FORMATION IN MEAT-IN-GRAVY PRODUCTS

BACKGROUND OF THE INVENTION

This invention relates to meat products packed in liquid and more particularly to preparing meat-in-gravy products which remain easily pourable throughout their shelf-life.

Meat products packed in liquid gravies for both human and animal consumption are well known. Examples of such products are meatballs in gravy, beef stroganoff, and the like, and their animal-oriented counterparts. Early attempts at preparing such products involved packing cooked meat pieces in a can or container with gravy, sealing the container, and distributing for use by the consumer. Such products, however, were severely hampered by their short shelf-life due to the growth of bacteria. Later methods directed to eliminating this problem employed a sterilization step after canning which involves subjecting the can and contents to sufficient temperatures to destroy bacteria and thereby prevent spoilage. Other methods package raw or partially cooked meat with gravy and subsequent heating accomplishes both the final cooking and sterilization in one step. These methods of heat treatment are commonly referred as retorting.

While the above-mentioned methods have generally been successful in increasing the shelf-life of meat-in-liquid products, the final heating after packaging presents other problems. It is well known that the connective tissue of the principle muscles of meat used in making the meat pieces in products of the type mentioned above contains the protein collagen. Collagen on heating in the presence of moisture dissolves and yields gelatin. Thus, subjecting a packaged meat-in-gravy product to high temperatures results in a "cooking-out" of the collagen and its decendent gelatin. When the packaged product is returned to room temperature for distribution and use, the gelatin, according to its well-known properties, causes the gravy to gel and results in a final product which is not readily pourable but must be spooned out.

It is accordingly an object of this invention to prepare a meat-in-gravy product of the type subjected to heat treatment after packaging and sealing which is easily pourable after storage at ambient conditions.

Another object of this invention is to prevent gel formation in a cooked meat-in-gravy product by employing material compatible with the final product which does not effect any undesirable flavor or odor characteristics.

These and other objects will become apparent upon reading the specification and claims which follow.

SUMMARY OF THE INVENTION

It has been discovered that a meat-in-gravy product of the type subjected to heat processing during or after packaging and sealing which remains readily pourable throughout its shelf-life may be prepared by adding to the product an amount of an acid sufficient to inhibit the gelling properties of collagen. The addition of the acid has been found to be effective even in small amounts thereby unaffecting the flavor and odor of the finished product.

DETAILED DESCRIPTION OF THE INVENTION

In accordance with the objects of this invention, a small amount of an acid is added to meat-in-gravy products to inhibit the formation of a gel in the gravy when the packaged product is subjected to further heat processing or retorting.

It is to be understood that this invention is applicable to any meat product which is combined with a liquid or gravy and processed with heat prior to or after packaging. Examples of methods of preparing such products include providing whole raw meat chunks, packing them in a can with gravy, and cooking the meat in the can; using precooked meat chunks and completing the cooking step after the chunks are packed with the gravy; using cooked meat chunks with a subsequent sterilization step after packaging; using comminuted meat either fresh or frozen, cooked or precooked, emulsified, mixed with binders or used alone, then mixed with gravy, packaged, and treated with heat; or other obvious variations all concluding with some form of retorting step.

It should also be appreciated that the process of this invention is equally applicable to aseptically packaged products prepared by heating and cooking the meat and gravy together, placing the heated product in a container, and sealing the container. Upon cooling, this type product will similarly exhibit the gel formation noticeable in retorted products as described above.

The meat products contemplated by this invention include meat products which are acceptable for human consumption as well as such items as meat trimmings which may be used in pet foods. Depending upon the end product desired, i.e., whether intended for animal or human consumption, the term "meat" as used herein may include beef, chicken, pork, liver, lamb, goat, horsemeat, fish, animal trimmings, animal by-products, combinations of these, and the like. The meat may be mixed with vitamins and mineral supplements if desired and also fats, cereals, flavorings, colorings, proteinaceous materials, and other conventional additives.

The gravies normally employed in such products are basically water with added thickeners such as gums, starches, and mixtures thereof, and coloring and flavoring agents may also be added. The gravy is normally prepared separately from the meat pieces and is usually formulated so as to result in a specific viscosity dependent on how it is to be used. Desirable thick gravies, which have a more pronouned tendency to gel and become rigid, may be more widely used with packaged meat products when treated in accordance with this invention.

When such meat products and gravies as described above are heated together after packaging, the protein collagen tends to cook out. The collagen dissolves to yield gelatin in the presence of heat, supplied from the cooking or sterilization step, and moisture, supplied by the gravy. On cooling, the gravy sets up in a gel due to the presence of the gelatin making it difficult for the consumer to pour out the contents of the can or package.

The addition of acid to the product has been found to effectively inhibit the formation of a gel in the gravy thereby producing an easily pourable meat-in-gravy product even when thick gravies are employed.

The acid may be added either to the gravy itself prior to mixing the gravy with the meat pieces or to the meat pieces themselves. While either method is suitable in most cases, the latter method has been found to be particularly advantageous when gravies containing milk products are used since the addition of acid to such a gravy tends to cause the milk protein to flocculate and settle out. Therefore, for the purpose of this invention, addition of the acid to the gravy portion of the meat-in-gravy product or to the surface of the meat after it has been processed is preferable.

Generally, any acid or acid solutions may be used to inhibit the gel-formation associated with retorted meat-in-gravy products. However, strong acids such as hydrochloric, sulfuric, nitric, and the like, when used in concentrated form, have been found to have a detrimental effect on the meat pieces which come in contact with such acids, such effect being generally in the form of rendering the meat mushy and destroying the integrity of the formed meat pieces. Sufficient dilution of these acids, however, enables their effective use for the purposes of this invention. A typical measure of the strength of acids is their Ionization Constant which is indicative of the degree of dissociation of the acid. Strong acids generally have Ionization Constants greater than $10^{-2}$ and, therefore, the acids preferred for use in this invention are those having Constants not greater than about $10^{-2}$, that is, weak acids. Examples of such acids are phosphoric, citric, succinic, tartaric, fumaric, adipic, acetic, malic, lactic, and the like, and mixtures thereof.

The amount of acid needed to inhibit gel formation is dependent upon the thickness of the gravy to be employed in the product, the severity of the heat treatment to which the product is to be subjected, the collagen content of the meat used, and, of course, the type acid used. Weaker acids usually require addition in greater amounts but this factor must be balanced against the flavor thresholds of the acid, i.e., the levels at which the acid imparts its own characteristic flavor. For example, use of phosphoric acid is dictated primarily by its strength, levels greater than 3.0 percent causing the meat pieces to beome mushy. On the other hand, acetic acid, due to its weakness as an acid, may be used at relatively high levels but the off-flavors imparted by it necessitate its use at significantly lower levels.

As a general consideration, the level of acid employed should not be so great as to significantly reduce the pH of the meat-in-gravy product since high acidity of the final product may cause overall palatability problems. Thus, the amount of acid added should not be such that the pH of the gravy or meat-in-gravy product is reduced to below about 2.5. Preferably, the pH should not be reduced below about 4.5. Acids such as phosphoric acid are preferably added at anywhere from 0.1 percent by wt. of the gravy mixture to 2.0 percent while citric acid may be added at levels from 0.5 to 3.5 percent subject to the considerations of strength, flavor, and pH mentioned above.

The following examples will serve to illustrate specific embodiments of the invention.

EXAMPLE I

A meatball-in-gravy mix for pets was prepared as follows:

A nutritionally balanced pet food mixture was made from the following ingredients:

|  | Percent |
|---|---|
| Whole Carcass Chicken | 50.35 |
| Poultry Meal | 15.25 |
| Corn Flour | 11.42 |
| Soy Protein | 10.00 |
| Salt | 1.53 |
| Minerals | .50 |
| Vitamins | .37 |
| Lard | 1.53 |
| Dye | .008 |
| Water | 9.042 |

The chicken was frozen, chopped into pieces, and comminuted using a Hobart grinder. The frozen chicken and the remainder of the ingredients is mixed, emulsified, and fed to a Hollymatic meatball forming machine to produce meat pieces one inch to 1⅜ inches long and ¾ inch in diameter. The meat pieces are then precooked using an infrared oven.

Gravies were prepared from the following ingredients.

|  | A Percent | B Percent |
|---|---|---|
| Water | 96.60 | 96.80 |
| Non-fat dried milk | 1.20 | 1.20 |
| Corn Syrup Solids | 1.80 | 1.80 |
| Phosphoric Acid (85% conc.) | 0.20 | — |
| CMC | 0.20 | 0.20 |

The meat pieces were divided into two equal portions. One portion was canned with Gravy A, the remaining portion was with Gravy B, both in 50/50 ratios of meat to gravy. Both products were retorted at 250°F for 60 minutes and allowed to cool to ambient conditions. The pH of gravy A was 5.8; the pH of gravy B was 6.2. When the canned foods were reopened, the product canned with gravy A exhibited no gel formation and was easily pourable, while the product canned with gravy B was difficult to pour due to the formation of a gel within the gravy.

EXAMPLE II

The meat pieces of Example I were placed in a can in a 50/50 ratio with a gravy made from the following ingredients:

|  | Percent |
|---|---|
| Starch | 1.6 |
| Dextrin | 1.2 |
| Meat Fines | .014 |
| Citric Acid | 0.6 |
| Water | 96.5 |
| Color | .005 |

The canned product was retorted at 250°F for 60 minutes, and then allowed to cool as in Example I. The product exhibited no gel formation when reopened and displayed no acid off-tastes.

While the invention has been described with respect to the specific embodiments presented above, they are intended to be illustrative only of a few of the many applications possible, and obvious variations are believed ascertainable without departing from the scope of this invention.

I claim:

1. In the preparation of a packaged meat-in-gravy pet food which at room temperature exhibits the formation of a gel in the gravy portion thereof comprising forming meat pieces containing collagen from meat by-products, adding said meat pieces to a liquid gravy comprised of water and added thickeners selected from the group consisting of gums, starches, and mixtures thereof to a container, sealing the container and retorting said container at temperatures sufficient to dissolve said collagen, the improvement comprising adding from about 0.5 percent to about 3.5 percent by weight of the gravy mixture of a weak acid selected from the group consisting of phosphoric acid, citric acid, and tartaric acid to said liquid gravy prior to sealing the container to inhibit formation of a gel in the liquid gravy upon cooling of said packaged meat-in-gravy food.

* * * * *